(No Model.)
A. C. & A. F. DUMKE.
VALVE AND GEAR FOR STEAM ENGINES.
No. 296,543. Patented Apr. 8, 1884.
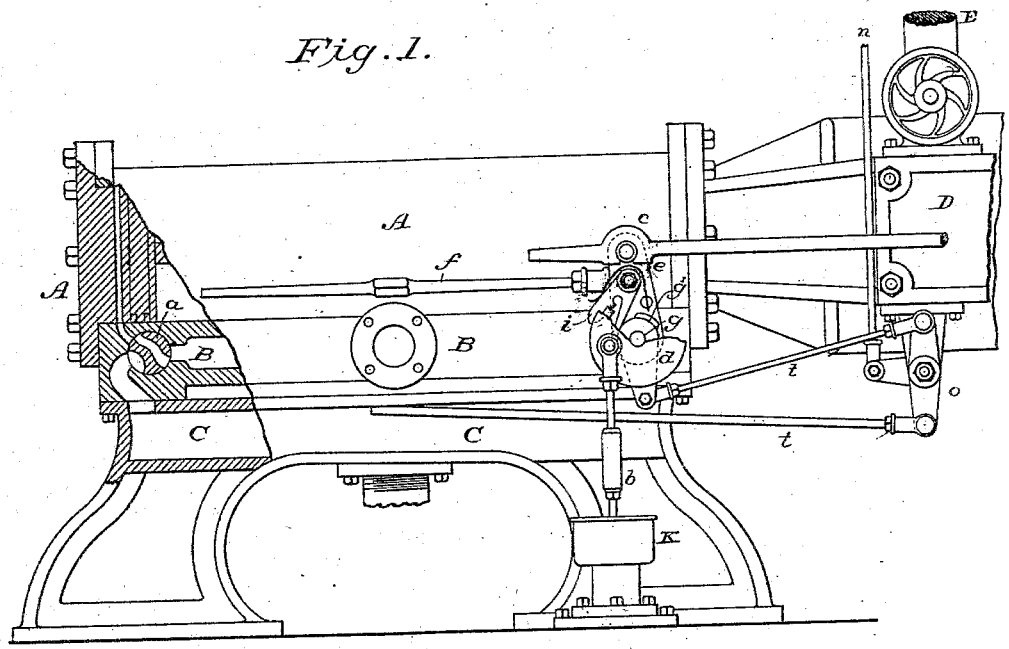
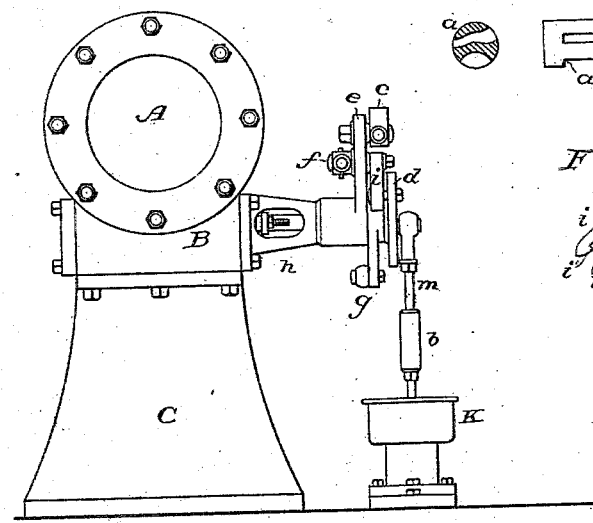
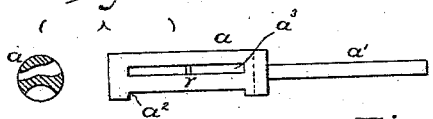
WITNESSES
Wm. A. Skinkle
Al. C. Newman
INVENTORS
August C. Dumke,
August F. Dumke,
By their Attorneys
Baldwin, Hopkins & Peyton

UNITED STATES PATENT OFFICE.

AUGUST C. DUMKE AND AUGUST F. DUMKE, OF MANITOWOC, WISCONSIN.

VALVE AND GEAR FOR STEAM-ENGINES.

SPECIFICATION forming part of Letters Patent No. 296,543, dated April 8, 1884.

Application filed May 25, 1883. (No model.)

*To all whom it may concern:*

Be it known that we, AUGUST C. DUMKE and AUGUST F. DUMKE, citizens of the United States, both residing at Manitowoc, in the county of Manitowoc and State of Wisconsin, have invented certain new and useful Improvements in Valves and Gear for Steam-Engines, of which the following is a specification.

Our invention relates to certain improvements in valves and valve-gear, as hereinafter described and specifically claimed.

In the accompanying drawings, Figure 1 is a side elevation, partly in section, of a horizontal steam-engine embodying our invention. Fig. 2 is an end view thereof. Fig. 3 is a detail view of our improved cylindrical rocking or rotary reciprocating valve; Fig. 4, a sectional detail view of the dash-pot rod, and Fig. 5 a detail view of the catch-hook which operates the valve.

A is the steam-cylinder, in the bed or under side of which is the steam-chest B, preferably cast therewith. At each end of the steam-chest, and near the ends of the cylinder, a horizontal cylindrical valve seat or chamber is formed for the reception of a cylindrical valve, F, illustrated in detail in Fig. 3. This valve communicates by suitable ports, preferably cast in the base of the cylinder, and all clearly illustrated in Fig. 1, with the cylinder A, the valve-chest B, and exhaust-chamber C. The exhaust-chamber is formed in the upper part of the standard or support C, on which the cylinder and steam-chest are mounted, and to which the steam-chest may be securely bolted.

We are aware that, broadly, it is not new to organize an engine with the steam-chest below the cylinder and the exhaust-chamber below the steam-chest; but the construction herein illustrated and described, in which the exhaust-chamber is formed in the standard or support of the cylinder, is new, and constitutes one feature of our invention.

Our improved valve, Fig. 3, consists of a cylindrical body, $a$, formed with closed or solid ends, and having a longitudinal curved recess or exhaust-passage, $a^2$, cut out of one side, and a slot, $a^3$, or steam-inlet port extending entirely through the body of the valve. The walls of this slot may be sustained by one or more partitions or supports, $r$, to prevent collapsing. The valve-spindle $a'$ is secured to the valve by a cross-head, which takes into a transverse notch or socket in the end of the valve-body, as indicated by the dotted line, and projects laterally from the steam-chest, being incased by a suitable bonnet, $h$. The connection between the spindle and valve is sufficiently loose to permit the valve to slip, so as always to keep the ports perfectly tight. It will be observed upon an examination of the valve shown in section in Fig. 1 that the live steam will always press the valve firmly against the walls of its socket and prevent any leakage of steam through the exhaust-port in whatever position the valve may be. One such valve is placed at each end of the cylinder and steam-chest, as shown in the drawings, and is coupled up with the valve-operating mechanism, which will now be described, so that these valves work as steam-inlets, cut-offs, and exhausts.

In describing the construction and operation of the mechanism we will only refer to the right-hand valve as viewed in the drawings, which is fully illustrated, it being understood that the other valve, which will be connected up to give the proper relative motion, is operated by the adjustable rod $f$, which is worked from the crank $e$, which actuates the first valve. The eccentric-rod $c$ from the main shaft of the engine rocks the crank $e$, mounted on the valve-bonnet $h$. A catch-hook, $i$, hinged loosely on the rocking or oscillating crank $e$, and normally pressed downward or toward the valve-spindle by a suitable spring, engages with a pin on the disk $d$, keyed to the valve-spindle $a'$, in the following manner: When the rocking crank $e$ is moved to the right, the hook $i'$ on the catch grasps the pin on the disk $d$ and draws the disk around to open the normally-closed valve and permit steam to enter the cylinder. The latch in this movement is tripped at the proper point of cut-off by the crank or cut-off regulator $g$, which is loosely pivoted on the valve-spindle and operated by the governor E, through the levers $n$, $o$, and $l$, so as to cause the cam or shoulder $g'$ to strike the under jaw or finger of the latch $i$ and throw the latch out of engagement with the pin. When this is done, the dash-pot K immediately returns the valve to its normal closed position. On the reverse motion of the crank $e$, when the steam is to be exhausted from the cylinder, a stud, $p$, on the same jaw of the latch, strikes the pin on the disk $d$, and moves the valve in the opposite direction for exhaust, the construction of the dash-pot rod $b$, which will presently be described, permitting this movement. The movement of the cut-off regulator may, obviously, be so adjusted from the governor as to regulate the amount of expansion as may be desired.

The dash-pot, which may be a gravity or vacuum pot, is connected with the disk or crank $d$ of the valve-spindle by a rod, $b$, constructed in the following manner: From Fig. 4, which illustrates this rod in detail, it will be seen that it consists of two stems, $m\ m'$, and an interposed socket, $b$, within which a coiled spring is placed. The upper stem, $m$, is provided with a swiveled head, which moves up and down in the socket $b$, being normally pressed upward by the coiled spring. By this construction the rod may lengthen or shorten to permit the positive motion of the valve-stem disk or crank $d$ caused by the latch $i$, as just described.

We are aware that, broadly, valves placed one at each end of a cylinder have been organized and operated to act as inlets, cut-offs, and exhausts somewhat after the manner herein described, and we therefore make no claim, broadly, to such an organization, our invention consisting in certain improvements of mechanism for such a system of operation.

By our invention we obtain a very perfect operation of the valves, reduce their friction and that of the gear, and materially reduce the complexity, and as a consequence the labor and material in building steam-engines of this class. The clearance in our improved engine is also reduced to a minimum.

We have shown our improvements applied to a horizontal engine, but obviously vertical engines may be organized in like manner without material variation.

The valve-body and its corresponding socket, instead of being cylindrical, as illustrated, might be made slightly conical, in order to insure a close joint and permit a slight adjustment to compensate wear. Various other modifications in the details of construction might be suggested without departing from the spirit of our invention.

The location of the steam-chest between the exhaust-chamber and the cylinder is not claimed herein, as it forms the subject-matter of another application filed by us on the 12th day of January, and serially numbered 117,235.

We claim as our invention—

1. The herein-described oscillating valve-operating catch, with a hook, $i'$, for moving the valve in one direction, a stud for moving the valve in the opposite direction, and a finger or projection by which the catch is tripped.

2. The herein-described valve, consisting of an elongated substantially cylindrical valve-body having closed or solid ends, a longitudinal slot through which the steam passes laterally to the cylinder, and an exhaust passage or recess cut in its side.

3. The combination, substantially as set forth, of the cylinder, the steam-chest, the exhaust-chamber, the valve seat or chamber formed at the end of the steam-chest and communicating with the cylinder, the steam-chest, and the exhaust-chamber, the rocking or rotary reciprocating valve seated in said valve-chamber having solid or closed ends and a longitudinal slot through which the steam passes laterally to the cylinder, and an exhaust recess or passage cut in its side, and mechanism for automatically operating the valve.

4. The combination, substantially as set forth, of the valve-spindle, the disk or crank secured thereto, the rocking crank, its actuating-rod, the oscillating catch-hook pivoted on said crank, the cut-off regulator, mechanism for automatically actuating it from the governor to trip the catch, and the dash-pot with an automatically-compensating rod.

5. The combination, substantially as set forth, of the valve-spindle, a crank, $e$, rocking on the same center as the valve-spindle, its actuating-rod, the disk or crank secured on the end of the valve-spindle, a catch-hook loosely pivoted on the rocking crank $e$, which opens the valve to admit steam to the cylinder, and mechanism for tripping the catch at the desired point of cut-off.

6. The combination, substantially as set forth, of the valve-spindle, the rocking crank $e$, its actuating-rod, the crank or disk secured on the end of the valve-spindle, the catch-hook pivoted on the crank $e$, which opens the valve to admit steam to the cylinder, mechanism for automatically tripping the catch at the desired point of cut-off, and a shoulder on the catch which turns the valve into the exhaust-position on the reverse movement of the crank $e$.

7. The dash-pot rod herein described, consisting of an upper and lower stem, a coupling-socket, and a spring contained in said socket.

8. The combination, substantially as set forth, of the valve-stem, the disk or crank secured thereon, mechanism for rocking the disk or crank in both directions from the normally-closed position of the valve, and a dash-pot having an automatically-compensating rod.

In testimony whereof we have hereunto subscribed our names this 22d day of May, A. D. 1883.

AUGUST C. DUMKE.
AUGUST F. DUMKE.

Witnesses:
H. C. BUHSE,
M. MALOY.